United States Patent
Kim et al.

(10) Patent No.: US 7,451,057 B2
(45) Date of Patent: Nov. 11, 2008

(54) SYSTEM AND METHOD FOR DETECTION OF FREEFALL WITH SPIN USING TWO TRI-AXIS ACCELEROMETERS

(75) Inventors: Dong Yoon Kim, Ithaca, NY (US); Scott A. Miller, Groton, NY (US)

(73) Assignee: Kionix, Inc., Ithaca, NY (US)

( * ) Notice: Subject to any disclaimer, the term of this patent is extended or adjusted under 35 U.S.C. 154(b) by 0 days.

(21) Appl. No.: 11/727,702

(22) Filed: Mar. 28, 2007

(65) Prior Publication Data

US 2008/0236282 A1    Oct. 2, 2008

(51) Int. Cl.
*G06F 15/00* (2006.01)
*G01P 15/00* (2006.01)
(52) U.S. Cl. .................................... 702/141
(58) Field of Classification Search ............... 702/35, 702/41, 141, 150, 189
See application file for complete search history.

(56) References Cited

U.S. PATENT DOCUMENTS

| 4,321,678 | A | * | 3/1982 | Krogmann | 701/220 |
| 4,470,562 | A | * | 9/1984 | Hall et al. | 244/3.2 |
| 2003/0163287 | A1 | * | 8/2003 | Vock et al. | 702/187 |

* cited by examiner

*Primary Examiner*—Bryan Bui
(74) *Attorney, Agent, or Firm*—Jones, Tullar & Cooper, P.C.

(57) ABSTRACT

A system and method detect freefall associated with an object that is spinning or tumbling as it falls. Two tri-axis accelerometers provide inputs to an algorithm that detects the freefall of a spinning object that would not otherwise be detected by a conventional freefall detection system, due to the centrifugal and centripetal forces being placed on the falling object as it spins. The system can be used to detect the freefall of portable devices with onboard memory or hard disk drives, allowing the devices to have time to park the read/write head and reduce the potential of losing data that can be damaged by impact. This freefall detection system may be applied to such portable devices as notebook computers, PDAs, MP3 players, digital cameras, mobile phones and even automobiles.

17 Claims, 5 Drawing Sheets

SYSTEM AND METHOD FOR DETECTION OF FREEFALL WITH SPIN USING TWO TRI-AXIS ACCELEROMETERS

BACKGROUND OF THE INVENTION

1. Field of the Invention

The present invention relates in general to a system and method for the detection of freefall with spin in portable electronic devices, in order to protect the hard disk drive or other sensitive components of such devices from damage due to impact.

2. Description of the Background Art

In recent years, the demand for portable electronic devices such as the notebook computer, PDA, MP3 player, digital camera, and mobile phone has increased significantly. As the use of portable electronic devices with always-on onboard memory or hard disk drives (HDD) increases, so does the risk of lost data due to physical impact of the devices when they are accidentally dropped. Data loss and its resulting loss in productivity have the potential to cause personal inconvenience, lost communications, reduced productivity and in more catastrophic cases, irretrievably lost data that could result in serious personal, family or business organization consequences.

To address the foregoing problem, freefall protection systems have been devised that can detect simple freefall of these portable devices and act to park the read/write head of the onboard memory or HDD prior to impact. However, while this current technology is able to detect acceleration changes in one-dimension, this same technology is not capable of accurately detecting the very common scenario associated with a dropped object that is experiencing "spin" (the revolution or tumbling of the object, as it falls).

An accelerometer at rest measures 1 G (gravity) of acceleration. An accelerometer will measure 0 G of acceleration in simple free fall, no matter the fall direction. However, there are problems associated with detecting the acceleration of an object with spin, which include the following. If an object is dropped with a spin of approximately 4 revolutions per second, an accurate and more likely real-life scenario, the accelerometer never approaches 0 G throughout the entire fall. Rather, the accelerometer will measure over 3.0 G during much of the fall as the spin causes centrifugal and centripetal acceleration to be placed on the object. In such a scenario, a conventional freefall system arrangement using a single tri-axis accelerometer with a high-G threshold will be useless in detecting the fall.

A further issue arises when portable electronics are being used in everyday activity, such as jogging or dancing, which may cause false detection of a falling event. The mobile device market is therefore in need, more then ever, for more reliable and accurate detection technology, for high-end protects in particular, that can distinguish between normal every day events and a fall prior to a potentially catastrophic impact.

SUMMARY OF THE INVENTION

The present invention solves the problems associated with previous fall detection devices that can only respond to the absence of gravity by providing a system and method that can detect freefall of a spinning object and distinguish this motion from other types of everyday activity that might inadvertently simulate freefall of the object. To accomplish this, the detection system and method employ an improved algorithm combined with first and second tri-axis accelerometers that provide inputs to the algorithm. The algorithm analyzes the inputs to determine when centrifugal or centripetal acceleration is occurring which indicates that the object is spinning and in freefall. In particular, the acceleration vectors from each of the tri-axis accelerometers are compared to determine whether they are both in the same plane. This can only occur if the force of gravity on the spinning object is zero, as it is during free fall. The algorithm uses the vector information to determine whether the vectors are either parallel to each other or intersect each other. These are both conditions that indicate that the vectors are in the same plane. If so, the algorithm determines that the object is in free fall and generates a control signal that is employed to operate a device which secures the device's hard drive or other component to be protected from impact.

Using the subject invention's algorithm with two tri-axis accelerometers not only facilitates detection of freefall with spin, but also requires a less expensive microprocessor with lower power consumption as compared to previous freefall detection devices. More particularly, the algorithm of the present invention can detect a freefall with spin condition from the vector outputs of the tri-axis accelerometers in as little as 3 sampling periods, which translates to a detection time of about 60 milliseconds when the sampling rate is 50 Hz. This allows more time for the protected mechanism, e.g. HDD, to react to the freefall indication, since a freefall of one meter generally takes 0.45 seconds (450 milliseconds). The accuracy and improvements associated with the present invention may allow for applicability beyond portable devices as it may also be applied to other objects that would benefit from freefall protection, such as automobiles, for example.

BRIEF DESCRIPTION OF THE DRAWINGS

The features and advantages of the present invention will become apparent from the following detailed description of a preferred embodiment thereof, taken in conjunction with the accompanying drawings, which are briefly described as follows.

DETAILED DESCRIPTION OF THE PREFERRED EMBODIMENT

Figure 1:
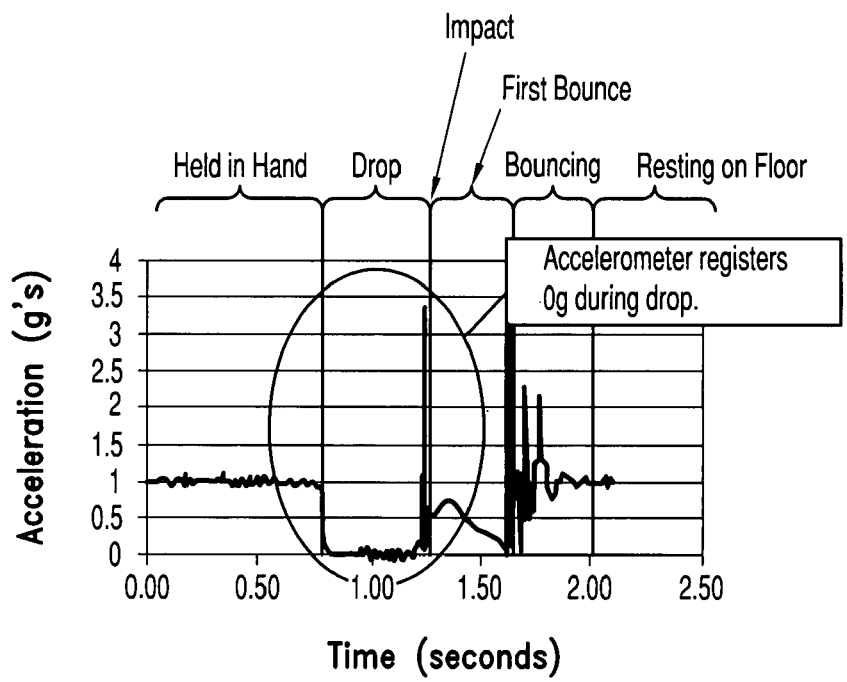
FIG. 1 is a graph representing the change in acceleration as a function of time of an object initially being held in a person's hand, and then being dropped until after the object comes to rest on the floor. The graph represents the reading of a conventional accelerometer, attached to an object falling to the earth without spin.

As already noted, an accelerometer at rest measures 1 G (force of gravity) of acceleration. An accelerometer will measure 0 G of acceleration in simple free fall, no matter the fall direction. The acceleration signal of a freefalling object without spin is shown in FIG. 1. The figure depicts the pre-drop acceleration condition, 1 G; the acceleration during the drop, approximately 0 G; the subsequent erratic spiking and crashing of the acceleration reading at impact; and the leveling out of the acceleration reading as the object rest on the floor at 1 G.

Figure 2:
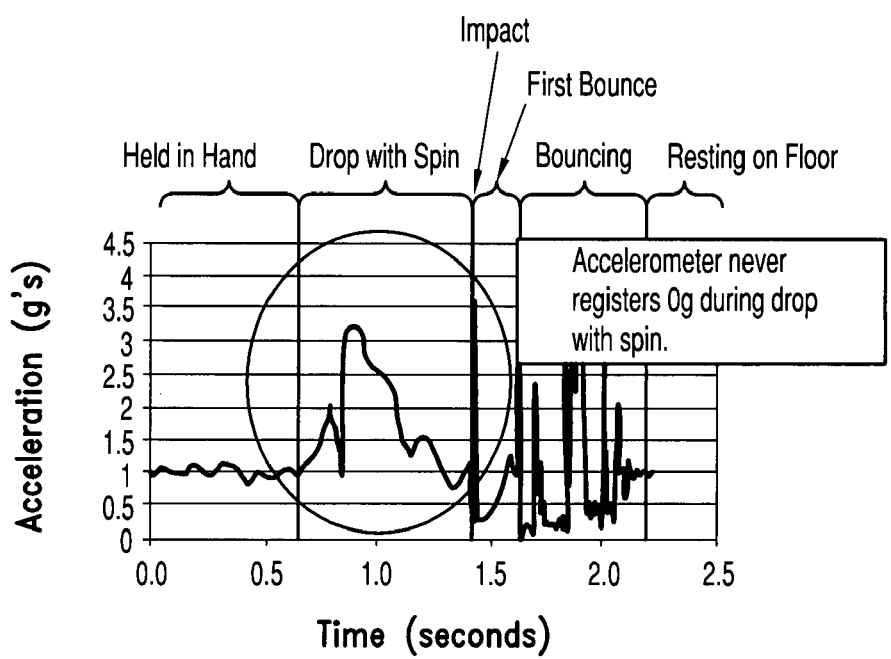
FIG. 2 is a graph representing the reading of a conventional accelerometer as a function of time which is attached to an object initially held in a person's hand, and then being dropped until after the object comes to rest on the floor. The object in this graph is falling to earth, with spin.

FIG. 2 illustrates the scenario when an object is dropped and at the same time, a spin is imparted to the object. If an object is dropped with a spin of approximately 4 revolutions per second, an accurate and more likely real-life scenario, the accelerometer never approaches 0 G throughout the entire fall. Rather, as illustrated, the accelerometer will measure over 3.0 G during much of the fall as the spin causes centrifugal and centripetal acceleration to be placed on the object. It should be noted that centrifugal acceleration is the force which displaces an object from the center of a spin, and centripetal acceleration is the force which holds an object in the center of the spin.

Figure 3:
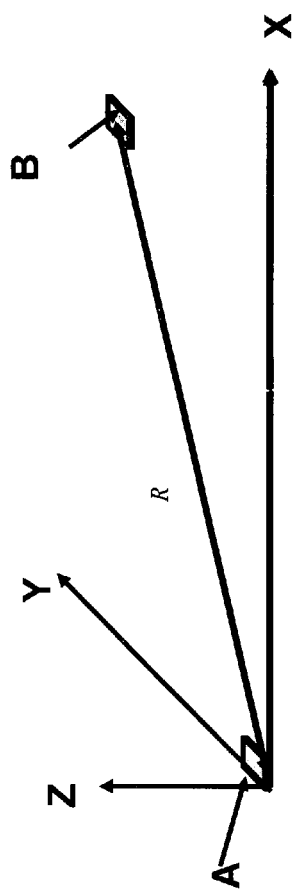
FIG. 3 is a diagram of the relative positioning of two accelerometers which are employed with the preferred embodiment and are positioned on a rigid object at locations A and B, respectively.

To measure free fall with spin, the preferred embodiment of the present invention uses a pair of tri-axis accelerometers to measure the acceleration of an object containing components to be protected from impact damage. The accelerometers are affixed to the object at a fixed distance apart from each other. The diagram of FIG. 3 illustrates this arrangement with a first accelerometer at location A and a second accelerometer at location B, which is a distance R from location A.

A mathematical assumption to enable the 2 accelerometers to recognize freefall is required for the algorithm employed by the preferred embodiment. This assumption is, stated simply, that tangential acceleration due to air resistance or "drag" is negligible. Therefore, only centrifugal or centripetal acceleration is to be considered for this algorithm. This assumption is expressed in Equation 1, where $A_T$ is the tangential acceleration, $\omega$ is the angular velocity, and $R_R$ is the radius arm of the rotation.

$$A_T = R_R \cdot \omega \cong 0$$

$$\therefore \omega \cong const \quad \text{Equation 1}$$

If the object is falling, with spin, then it should rotate around a certain axis while falling. The 2 centrifugal accelerations will therefore lie on a certain plane, because the 2 accelerometers are attached physically to the rigid body of the falling object. As the object is falling and spinning, the vectors for A and B must therefore lie on a plane because the gravity does not exist any more and only the centrifugal force is exerted on the object. Due to the centrifugal acceleration, the two vectors are either parallel or they intersect at a certain point.

Figure 4:
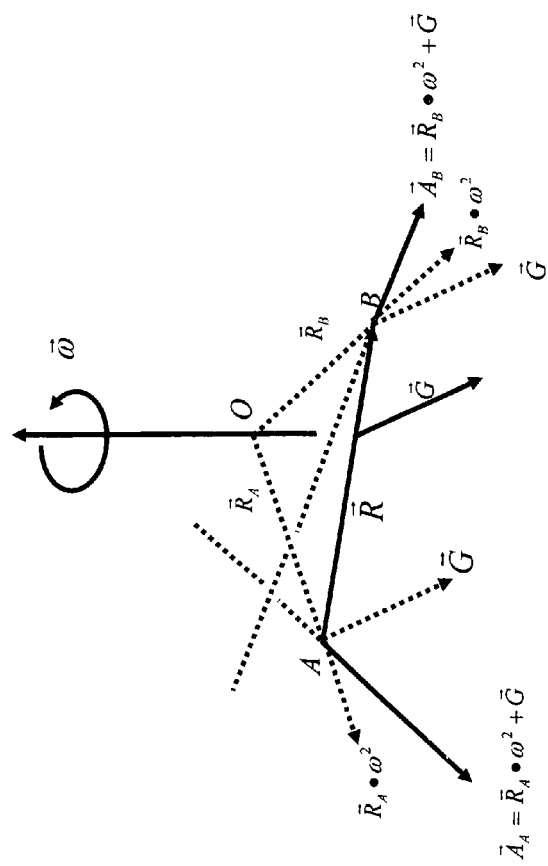
FIG. 4 is a graphical depiction of the acceleration vectors generated by accelerometers A and B when they are affixed to an object that is not in freefall, such that gravitational force (G) is acting on the object.

The basic premise of the algorithm is thus to check whether the 2 acceleration vectors lie on the same plane. If the measurements $A_A$ and $A_B$ lie on a single plane (plane AOB, in FIG. 4), then the 2 measurements should be parallel or intersect each other at a certain point on the plane. By checking these 2 conditions (parallelism and intersection), it can be determined whether the object is falling with spin. FIG. 4 shows the acceleration vectors in the case of an every day event. During such normal usage (non-falling events), the gravity (G) is always involved in the measurement such that the accelerometers sense the resultant acceleration vector of gravity and centrifugal acceleration at the same time. The measurement vectors $A_A$ and $A_B$ cannot intersect each other because of the gravity vector, which skews the 2 vectors in 3-dimensional space. The $A_A$ and $A_B$ vectors of FIG. 4 are therefore not located in one plane.

In FIG. 4, G is the gravity vector, $\omega$ is the angular speed with respect to a rotational axis, and $R_A$ and $R_B$ are the rotation arm from the imaginary rotation axis (as if gravity was not affecting vectors $A_A$ and $A_B$).

Figure 5:
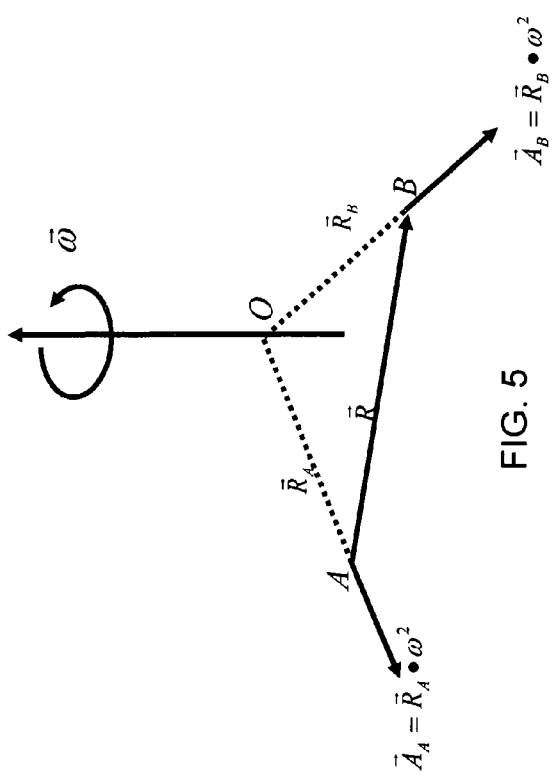
FIG. 5 is a graphical depiction of the acceleration vectors generated by accelerometers A and B when they are affixed to an object that is in freefall such that no gravitational force is acting on the object.

In reviewing Equations 2 and 3, $\vec{A}_A = \vec{R}_A \omega^2 + \vec{G}$ and $\vec{A}_B = \vec{R}_B \cdot \omega^2 + \vec{G}$, when the object is falling with spin, the object is not subject to gravitational acceleration, such that G quickly approaches the value of 0 (zero). Therefore, only the acceleration components in Equations 2 and 3 ($\vec{R}_A \omega^2$, $\vec{R}_B \omega^2$) would remain. As long as the object is a rigid body, the 2 vectors will lie on one plane. FIG. 5 depicts the measurement in the case of freefall with spin; as such that no gravitational force is depicted in the drawing. FIG. 5 also helps explain why conventional freefall detection using one accelerometer would not work on freefall with spin, as the acceleration values in FIG. 5 would never approach 0 (zero) as long as the object continues to spin up until the point of impact.

The following analysis provides the equations necessary to confirm whether either of the conditions which indicate that the measurement vectors lie in one single plane, parallelism and intersection, are present at any given instant. The cross product of the measurement vectors is used to check these conditions. If $\vec{A}_A \times \vec{A}_B$ equals zero, then the two vectors are parallel. The condition can be expressed like the following:

$$\vec{A}_A = \vec{R}_A \cdot \omega^2 + \vec{G} \qquad \text{Equations 2 and 3}$$
$$\vec{A}_B = \vec{R}_B \cdot \omega^2 + \vec{G}$$

$$\vec{A}_A \times \vec{A}_B = \begin{vmatrix} \vec{i} & \vec{j} & \vec{k} \\ A_X & A_Y & A_Z \\ B_X & B_Y & B_Z \end{vmatrix} = 0 \qquad \text{Equation 4}$$

$$\begin{vmatrix} \vec{i} & \vec{j} & \vec{k} \\ A_X & A_Y & A_Z \\ B_X & B_Y & B_Z \end{vmatrix} = \begin{matrix} (A_Y \cdot B_Z - A_Z \cdot B_Y)\vec{i} - \\ (A_X \cdot B_Z - A_Z \cdot B_X)\vec{j} + \\ (A_X \cdot B_Y - A_Y \cdot B_X)\vec{k} = 0 \end{matrix} \qquad \text{Equation 5}$$

$$A_Y \cdot B_Z - A_Z \cdot B_Y = 0 \qquad \text{Equation 6}$$
$$A_X \cdot B_Z - A_Z \cdot B_X = 0$$
$$A_X \cdot B_Y - A_Y \cdot B_X = 0$$

$$\vec{A}_A = A_X \vec{i} + A_Y \vec{j} + A_Z \vec{k} \qquad \text{Equation 7}$$
$$\vec{A}_B = B_X \vec{i} + B_Y \vec{j} + B_Z \vec{k}$$

$A_X, A_Y, A_Z, B_X, B_Y, B_Z$ in Equation 7 are the components of acceleration in the X, Y, and Z axis of accelerometers A and B, respectively, while i, j, k are the unit vectors of coordinates X, Y, and Z.

In order to check whether the cross product is zero, Equation 6 should be satisfied.

Once $\vec{A}_A \times \vec{A}_B$ is zero, then the two vectors are parallel, but the magnitude is not known exactly. And if $\vec{A}_A = \vec{A}_B$ it is impossible to detect spin. Because gravity affects both accelerometers equally, they should be parallel even though the object is under gravity. In theory, this case can rarely happen. Otherwise (in case of $\vec{A}_A \neq \vec{A}_B$), freefall with spin can be detected on the basis of parallelism. There is, however, one exceptional case. If at least one of the rotation of axes is perpendicular to the gravity, $(\vec{A}_A \times \vec{G} = 0 \ \vec{A}_B \times \vec{G} = 0)$, then it cannot be detected for the same reason as the previous case.

If $\vec{A}_A \times \vec{A}_B \neq 0$, then one has to check whether the 2 vectors lie on a plane through intersection. In order to know whether the 2 vectors meet at one arbitrary point, we use the condition $\vec{R} \cdot (\vec{A}_A \times \vec{A}_B) = 0$. The cross product can be zero even though one vector is off the other; that is they skew in the space. Only if the condition is met, then the 2 vectors intersect each other. The vector $\vec{A}_A \times \vec{A}_B$ is perpendicular to both vectors $\vec{A}_A, \vec{A}_B$ and to the distance vector $\vec{R}$.

Figure 6:
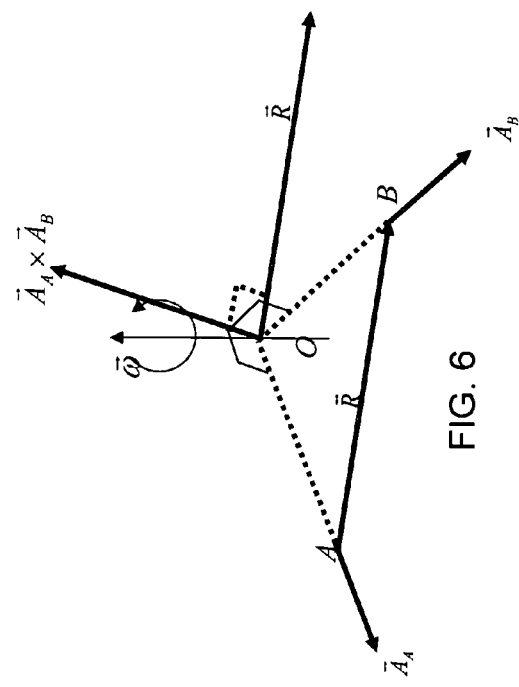
FIG. 6 is a diagram of the relationship between the cross product of two vectors and $A_A$ and $A_B$ and distance vector R.

The distance vector $\vec{R}$ links the 2 accelerometers physically. If the vector $\vec{A}_A \times \vec{A}_B$ made by the rotation one of the 2 vectors $\vec{A}_A, \vec{A}_B$ is perpendicular to distance vector $\vec{R}$, then the distance vector $\vec{R}$ should be on a plane made by two measurement vectors $(\vec{A}_A, \vec{A}_B)$. This means that $\vec{A}_A \times \vec{A}_B$ meets at a certain point. Due to the geometric compatibility condition, these form a single plane in 3 D space. FIG. 6 depicts when the condition $\vec{R} \cdot (\vec{A}_A \times \vec{A}_B) = 0$ is met figuratively.

There is an exceptional case when $\vec{G} \cdot (\vec{A}_A \times \vec{A}_B)$ is zero. Here, freefall with spin cannot be detected because the rotation axis is the same as the direction of gravity.

In summary, one can say the measurement vectors are intersecting and thus the object is falling with spin if $\vec{A}_A \times \vec{A}_B \neq 0$ and $\vec{R} \cdot (\vec{A}_A \times \vec{A}_B) = 0$.

Figure 7:
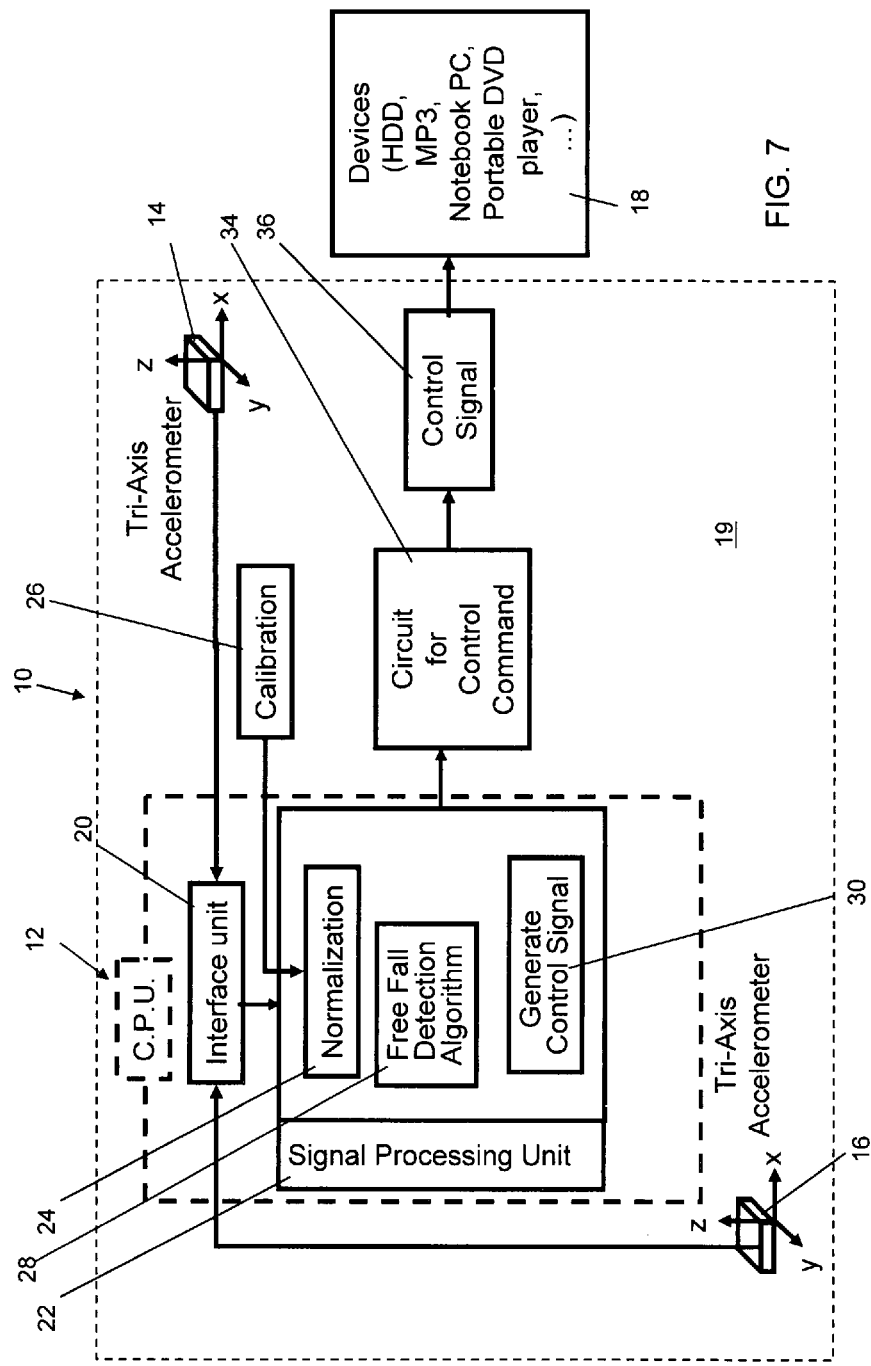
FIG. 7 is a block diagram of a system configured in accordance with the present invention to detect free fall with spin of a device and respond by securing an HDD or other component on said device.

With reference now to the block diagram of FIG. 7, a fall detection system 10 is illustrated that is configured in accordance with a preferred embodiment of the present invention and employs an algorithm that applies the foregoing equations to accelerometer measurements. The system 10 includes a CPU 12 for receiving and processing acceleration signals generated by first and second tri-axis accelerometers 14 and 16. The tri-axis accelerometers 14 and 16 can be any type known tri-axis accelerometers, such as mechanical, piezoelectric and MEMS accelerometers.

The accelerometers 14 and 16 are each fixed to a device 18 to be protected from fall induced impact damage. As noted with respect to FIG. 4, the accelerometers are positioned a fixed known distance R away from each other on the device 18. Preferably, this is accomplished by mounting each of the components of the system 10 on a common circuit board shown by the dashed lines 19, which is then mounted inside the protected device 18. Alternatively, the accelerometers 14 and 16 can be directly mounted to the physical structure of the device 18. The types of devices most likely to be protected with the system 10 include HDDs, MP3 players, notebook PCs, portable DVD players, etc.

The CPU 12 includes an interface unit 20 for interfacing signals received from each of the accelerometers 14 and 16 to a signal processing unit 22. The signal processing unit 22 includes a normalization algorithm 24 for normalizing the signals received from the accelerometers 14 and 16 based on information received from a calibration circuit 26. The most significant part of the system 10 is a free fall with spin detection algorithm 28 to be discussed in greater detail, in conjunction with FIG. 8. When the detection algorithm 28 detects a freefall with spin condition, a command to generate a control signal 30 is fed to a circuit for control command 34, which then instructs a control signal generator 36 to trigger operation of mechanisms to secure the read/write head of the HDD or other mechanism in the device 18 which needs to be moved to a secure locked down position prior to impact of the device 18 with the floor or another object.

Figure 8:
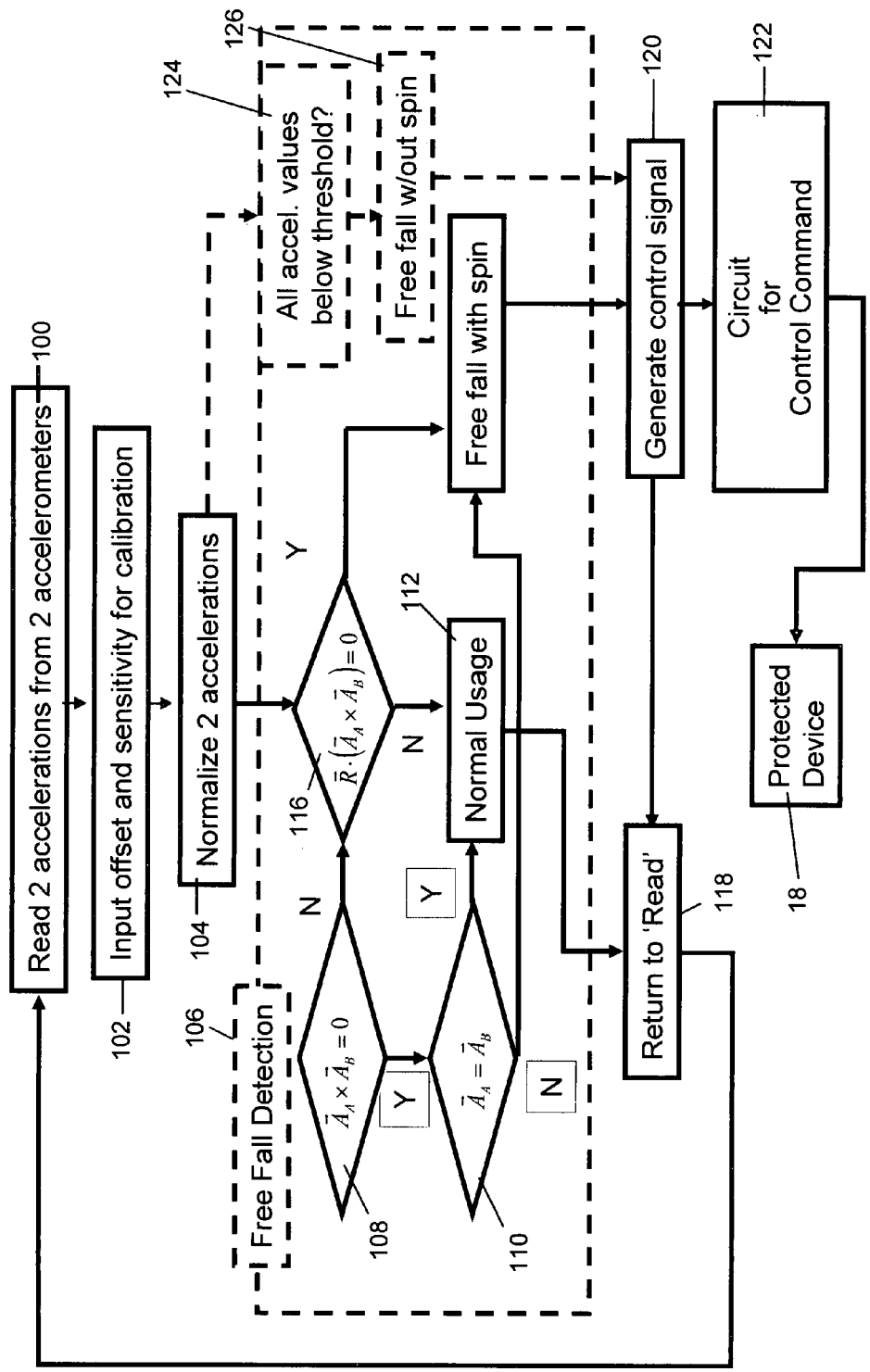
FIG. 8 is a flowchart depicting an algorithm employed by the system of the present invention to detect free fall of an object with spin and respond thereto by taking steps to secure the HDD of the device.

With reference to the flow chart of FIG. 8, the step by step flow of the method of the preferred embodiment is illustrated. First, at step 100, the acceleration signals generated by each accelerometer are read into the CPU 12 for analysis. This step is repeated over and over many times a second. At step 102, the raw signals from the accelerometers 14 and 16 are conditioned with an input offset and sensitivity for calibration. At step 104, the acceleration readings are normalized.

Next, the acceleration signals are fed to the heart of the system and method, the free fall with spin detection algorithm 106, which is indicated by the dashed box in FIG. 8 and includes the following steps.

In view of the previous discussion, the purpose of the free fall detection algorithm 106 is to determine whether the acceleration vectors generated by each of the accelerometers 14 and 16 lie in the same plane. This condition only occurs if the device to which the accelerometers are attached is in free fall with spin. To determine if the acceleration vectors generated by each of the accelerometers lie in the same plane, the vectors are checked for parallelism and intersection as discussed previously. First, at step 108, the cross product of the two vectors is calculated. If this is zero, then the vectors cannot possibly intersect and will in fact be parallel assuming the vectors are not the same as one another. The latter condition is checked at step 110. If the vectors are the same, then it is concluded at step 112 that the detected movement of the device is from normal usage, not free fall with spin. On the other hand, if the two vectors are not the same, the algorithm determines at step 114 that the object is undergoing free fall with spin and activation of a protection control system is warranted.

To check for intersection of the two vectors which also indicates that they lie in the same plane as preciously discussed, after it is determined at step 108, that the cross product of the vectors is not zero, then at step 116, it is determined whether $\vec{R} \cdot (\vec{A}_A \times \vec{A}_B) = 0$. If so, free fall with spin is detected. If not, normal movement of the device is confirmed.

If normal movement of the device is determined at step 112, then the algorithm returns at step 118, to make additional accelerometer readings, thereby starting the process over again. Similarly, if free fall with spin is determined at step 114, a control signal generated command is issued at step 120 and then the algorithm returns to make more readings. When the control signal generation command is issued, this is fed to a circuit for control command 122 which generates the necessary signals to secure the HDD or other protected component of the protected device 18.

It should be understood that the freefall detection algorithm 108 can easily be modified to detect separately, and in addition to the freefall with spin condition, a freefall condition without spin as is done in previous freefall detection systems. As indicated by the dashed boxes in FIG. 8, all this requires is that the all of the acceleration vector outputs x, y and z, of the 2 accelerometers be monitored and if all of these outputs drop below a predetermined minimum threshold at step 124, which is on the order of 0.3-0.4 g's, then a freefall without spin condition would be indicated at step 126 and steps would be taken as before to secure the protected device 18.

Although the invention has been disclosed in terms of a preferred embodiment and variations thereon, it will be understood that numerous other variations and modifications could be made thereto without departing from the scope of the invention as defined by the following claims.

What is claimed is:

1. A system for detecting freefall of an object comprising:
   first and second tri-axis accelerometers A and B located a predetermined fixed distance R apart from each other, each of said accelerometers generating first, second and third acceleration vector signals indicative of a magnitude and direction of acceleration forces imparted thereto;
   a processor including a software module for processing said acceleration vector signals and determining therefrom whether said accelerometers are being exposed to centrifugal accelerations in a zero gravity condition resulting from a spin; and
   a signal generator for generating a control signal in response to determination by said processor that said accelerometers are undergoing freefall with spin in a common plane.

2. The system of claim 1, wherein said software module determines a freefall with spin condition by comparing the acceleration vectors generated by each of said accelerometers to one another to determine whether the vectors, lie in a common plane; and if so, generating a freefall with spin indication signal that is employed to cause said signal generator to generate said control signal.

3. The system of claim 2, wherein said software module is programmed to determine that a freefall with spin condition is occurring if either of the following conditions is met:
   1) the cross product of the acceleration vectors generated by said first and second accelerometers A and B is zero ($\vec{A}_A \times \vec{A}_B = 0$) and said acceleration vectors from said first and second accelerometers are not equal to one another ($\vec{A}_A \neq \vec{A}_B$); or
   2) the cross product of the acceleration vectors generated by said first and second accelerometers A and B is not zero ($\vec{A}_A \times \vec{A}_B \neq 0$), but the distance vector is perpendicular to the acceleration vectors of A and B such that $\vec{R} \cdot (\vec{A}_A \times \vec{A}_B) = 0$.

4. The system of claim 1, wherein said system components are disposed on a circuit board to be mounted in or on said object.

5. The system of claim 1, wherein said first and second accelerometers are mounted a fixed distance R from each other in or on said object.

6. The system of claim 1, wherein each of said tri-axis accelerometers is selected from the group including mechanical, piezoelectric and MEMS accelerometers.

7. The system of claim 1, wherein said software module is also programmed to determine whether said accelerometers are exposed to a freefall without spin condition by determining when all of the acceleration vectors of the accelerometers are below a threshold value.

8. The system of claim 1, wherein said object is an electronic device and said control signal is used for controlling a protection system in said electronic device for protecting said electronic device from physical impact induced damage.

9. The system of claim 8, wherein said electronic device is selected from the group including HDDs, MP3 players, notebook PCs and portable DVD players.

10. A method for detecting freefall of an object comprising:
    locating first and second tri-axis accelerometers A and B a predetermined fixed distance R apart from each other, each of said accelerometers generating first, second and third acceleration vector signals indicative of a magnitude and direction of acceleration forces imparted thereto;
    processing said acceleration vector signals with a software algorithm and determining therefrom whether said accelerometers are being exposed to centrifugal accelerations in a zero gravity condition resulting from a spin; and
    generating a control signal in response to determination that said accelerometers are undergoing freefall with spin in a common plane.

11. The method of claim 10, wherein a freefall with spin condition is determined by comparing the acceleration vectors generated by each of said accelerometers to one another to determine whether the vectors, lie in a common plane; and if so, generating a freefall with spin indication signal that causes generation of said control signal.

12. The method of claim 9, wherein a freefall with spin condition is determined to be occurring if either of the following conditions is met:
    1) the cross product of the acceleration vectors generated by said first and second accelerometers A and B is zero ($\vec{A}_A \times \vec{A}_B = 0$) and said acceleration vectors from said first and second accelerometers are not equal to one another ($\vec{A}_A \neq \vec{A}_B$); or
    2) the cross product of the acceleration vectors generated by said first and second accelerometers A and B is not zero ($\vec{A}_A \times \vec{A}_B \neq 0$), but the distance vector is perpendicular to the acceleration vectors of A and B such that $\vec{R} \cdot (\vec{A}_A \times \vec{A}_B) = 0$.

13. The method of claim 10, wherein said first and second accelerometers are mounted a fixed distance R from each other in or on said object.

14. The method of claim 10, wherein each of said tri-axis accelerometers is selected from the group including mechanical, piezoelectric and MEMS accelerometers.

15. The method of claim 10, wherein said software algorithm also determines whether said accelerometers are exposed to a freefall without spin condition by determining when all of the acceleration vectors of the accelerometers are below a threshold value.

16. The method of claim 10, wherein said object is an electronic device and said control signal is used for controlling a protection system in said electronic device for protecting said electronic device from physical impact induced damage.

17. The method of claim 16, further including mounting said accelerometers on said electronic device, said device being selected from the group including HDDs, MP3 players, notebook PCs and portable DVD players.

* * * * *